US012031108B2

(12) United States Patent
Roeder et al.

(10) Patent No.: US 12,031,108 B2
(45) **Date of Patent: *Jul. 9, 2024**

(54) ACIDIC LIQUID FABRIC CARE COMPOSITIONS

(71) Applicant: The Procter & Gamble Company, Cincinnati, OH (US)

(72) Inventors: Rachel Morgan Roeder, Mason, OH (US); Jennifer Lea Rinker, Hamilton, OH (US); Marc Johan Declercq, Strombeek-Bever (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,272

(22) Filed: Nov. 1, 2022

(65) Prior Publication Data

US 2023/0147730 A1 May 11, 2023

(30) Foreign Application Priority Data

Nov. 2, 2021 (EP) .................................... 21205851

(51) Int. Cl.

*C11D 1/66* (2006.01)
*B08B 3/04* (2006.01)
*C11D 1/08* (2006.01)
*C11D 3/20* (2006.01)
*C11D 3/50* (2006.01)
*C11D 17/00* (2006.01)

(52) U.S. Cl.

CPC .............. *C11D 1/08* (2013.01); *C11D 3/2072* (2013.01); *C11D 3/50* (2013.01); *C11D 17/0008* (2013.01); *C11D 2111/12* (2024.01)

(58) Field of Classification Search

CPC ......... C11D 1/66; C11D 3/042; C11D 3/2086; C11D 3/50; B08B 3/04

See application file for complete search history.

(56) References Cited

U.S. PATENT DOCUMENTS

| | | | | |
|---|---|---|---|---|
| 2011/0146725 | A1* | 6/2011 | Woo | C11D 3/2079 510/405 |
| 2019/0090483 | A1 | 3/2019 | Hanson et al. | |
| 2020/0140789 | A1* | 5/2020 | Delaney | C11D 7/265 |

FOREIGN PATENT DOCUMENTS

| | | | | |
|---|---|---|---|---|
| EP | 3650523 | A1 | 5/2020 | |
| EP | 3650524 | * | 5/2020 | C11D 3/20 |
| EP | 3650524 | A1 | 5/2020 | |
| JP | 2007106921 | A | 4/2007 | |
| WO | 9961572 | A1 | 12/1999 | |
| WO | 02055648 | A1 | 7/2002 | |

OTHER PUBLICATIONS

16155 PCT Search Report and Written Opinion for PCT/US2022/079012 dated Feb. 14, 2023, 18 pages.
All Office Actions; U.S. Appl. No. 17/978,288, filed Nov. 1, 2022.
U.S. Appl. No. 17/978,288, filed Nov. 1, 2022 to Rachel Morgan Roeder et al.
16155F Extended European search report and search opinion for Application No. 21205851.5, dated Apr. 20, 2022, 09 pages.
All Office Actions: U.S. Appl. No. 18/310,789, filed May 2, 2023.
U.S. Appl. No. 18/310,789, filed May 2, 2023, Shelby Phillip Salley et al.
All Office Actions; U.S. Appl. No. 18/390,341, filed Dec. 20, 2023.
U.S. Appl. No. 18/390,341, filed Dec. 20, 2023 to Rachel Morgan Clayton Roeder et al.

* cited by examiner

*Primary Examiner* — Brian P Mruk
(74) *Attorney, Agent, or Firm* — Andrew J. Mueller; Gregory S. Darley-Emerson

(57) ABSTRACT

Acidic liquid fabric care compositions that include citric acid and/or a salt thereof, fragrance material that includes certain aldehydic perfume raw materials, and water. Related methods of using and making such compositions.

19 Claims, No Drawings

ACIDIC LIQUID FABRIC CARE COMPOSITIONS

FIELD OF THE INVENTION

The present disclosure relates to an acidic liquid fabric care composition that includes citric acid and/or a salt thereof, fragrance material that includes certain aldehydic perfume raw materials, and water. The present disclosure also relates to methods of using and making such compositions.

BACKGROUND OF THE INVENTION

Certain liquid fabric care compositions that have a low pH and low-to-nil amounts of surfactant, softeners, or bleach can still be useful for providing fabric care benefits, particularly as through-the-rinse applications in automatic washing machines. For example, such compositions can provide softening benefits and/or be useful in for removing limescale that may accumulate on fabrics, such as towels, particularly when the fabrics have been washed in hard water.

Such compositions may include relatively high levels of citric acid and/or related salts. Fragrance materials (e.g., perfume) may also be added to the compositions in order to improve the neat product odor and/or to provide freshness benefits to the target fabrics upon treatment.

However, it has been found that such compositions may experience color instability issues upon storage, which may signal product degradation and/or reduced efficiency to the consumer. In particular, it is believed that the presence of perfume raw materials contribute to the discoloration of such compositions.

There is a need for improved low-pH fabric care compositions that include fragrance material.

SUMMARY OF THE INVENTION

The present disclosure relates to liquid fabric care composition that have certain aldehydic perfume raw materials, and are characterized by a relatively low pH.

For example, the present disclosure relates to a liquid fabric care composition that includes: from about 10% to about 50%, by weight of the liquid fabric care composition, of citric acid and/or a salt thereof; from about 0.01% to about 20% of fragrance material, wherein the fragrance material includes first aldehydic perfume raw materials, where the first aldehydic perfume raw materials are characterized by at least one of the following structures (a, b, or c):

a) $R^1—C(R^2)(R^3)—C(R_4)(R^5)—CHO$, wherein $R^2$, $R^3$, $R^4$, and $R^5$ are independently selected from hydrogen or a hydrocarbon moiety, wherein the hydrocarbon moiety may be substituted or unsubstituted, with the proviso that at least one of $R^2$, $R^3$, $R^4$, or $R^5$ is a hydrocarbon moiety;
b) $R^1—C(R^2)═C(R^4)—CHO$, wherein $R^2$ and $R^4$ are independently selected from hydrogen or a hydrocarbon moiety, wherein the hydrocarbon moiety may be substituted or unsubstituted;
c) $R^1—Ar—CHO$, wherein Ar is a substituted or unsubstituted aryl ring;

where for each of the structures according to a), b), and c), each $R^1$ is independently selected from H, a substituted hydrocarbon moiety, or an unsubstituted hydrocarbon moiety; from about 30% to about 90%, by weight of the liquid fabric care composition, of water; where the composition comprises less than 5%, by weight of the liquid fabric care composition, of a material selected from the group consisting of detersive surfactant, bleaching systems, fabric softening materials, and mixtures thereof; where the liquid fabric care composition is characterized by a neat pH of from about 2 to about 6.

The present disclosure also relates to a method of treating a fabric, where the method includes the step of contacting the fabric with a liquid fabric care composition as described herein.

The present disclosure also relates to a method of making a liquid fabric care composition as described herein, where the method includes the step of combining water, citric acid, and a fragrance material, preferably where the fragrance material is premixed with nonionic surfactant.

DETAILED DESCRIPTION OF THE INVENTION

The present disclosure relates to acidic liquid fabric care compositions. The compositions include citric acid, fragrance material that includes certain aldehydic perfume raw materials, and water. Such compositions are believed to be relatively color stable versus comparative compositions.

Without wishing to be bound by theory, it is believed that many commonly used aldehydic perfume raw materials tend to lead to discoloration in acidic, aqueous fabric care treatment compositions. This results in a challenge for the formulator, as aldehydic perfume raw materials are often preferred to provide a pleasant olfactory experience to the consumer during use and on the treated fabrics.

The present disclosure provides a solution to this choice between significant product discoloration and a desired freshness profile. It has surprisingly been found that by selecting certain aldehydic perfume raw materials having particular structural characteristics, the resulting treatment compositions experience a surprisingly low level of discoloration.

The compositions and related methods are described in more detail below.

As used herein, the articles “a” and “an” when used in a claim, are understood to mean one or more of what is claimed or described. As used herein, the terms “include,” “includes,” and “including” are meant to be non-limiting. The compositions of the present disclosure can comprise, consist essentially of, or consist of, the components of the present disclosure.

The terms “substantially free of” or “substantially free from” may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase “fabric care composition” includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Composition

The present disclosure relates to liquid fabric care compositions that have a relatively low pH. Put another way, the present disclosure relates to acidic, liquid fabric care compositions.

The compositions of the present disclosure may be particularly useful for treating fabrics, such as garments or towels, during the rinse cycle of an automatic washing machine. Due to the low pH of the compositions, they can be useful for softening fabrics and/or for rejuvenating colors by removing limescale that may have accumulated on the fabrics, which can result from washing one's fabrics in hard water.

The compositions comprise citric acid and/or a salt thereof. As one of ordinary skill will realize, the citric acid and a salt thereof may exist in an equilibrium in the liquid composition. Citric acid is preferred for use in the present compositions due to being both a performance-efficient and cost-efficient material, as well as being readily available.

The compositions may comprise from about 10% to about 50%, by weight of the liquid fabric care composition, of citric acid and/or a salt thereof. The liquid fabric care composition may comprise from about 15% to about 40%, preferably from about 20% to about 30%, by weight of the liquid fabric care composition, of the citric acid and/or the salt thereof.

The liquid fabric care compositions of the present disclosure comprise a fragrance material (also herein "fragrance" or "perfume"). The fragrance materials are added to provide aesthetically pleasing scent to the liquid product composition, to a treatment liquor, and/or to fabrics treated with the composition. The compositions of the present disclosure may include from about 0.1% to about 20%, or from about 0.2% to about 10%, or from about 0.3% to about 5%, by weight of the composition, of fragrance materials.

Non-limiting examples of fragrance materials include, but are not limited to, aldehydes, ketones, esters, and the like. Other examples include various natural extracts and essences which can comprise complex mixtures of ingredients, such as orange oil, lemon oil, rose extract, lavender, musk, patchouli, balsamic essence, sandalwood oil, pine oil, cedar, and the like. Finished perfumes can comprise extremely complex mixtures of such ingredients.

The fragrance material may comprise aldehydic perfume raw materials. Without wishing to be bound by theory, it is believed that while aldehydic perfume raw materials are often desirable from an olfactory/freshness point of view, they may also have a tendency to discolor.

Thus, the fragrance material of the composition of the present disclosure comprises first aldehydic perfume raw materials as described in more detail below. The first aldehydic perfume raw materials are selected for their relative color stability in the acidic compositions of the present disclosure. Put another way, compared to other aldehyde-containing perfume raw materials, the first aldehydic perfume raw materials as described herein are believed to be less likely to lead to discoloration in the present compositions. Without wishing to be bound by theory, it is believed that the presently described first aldehydic perfume raw materials are sterically hindered, and/or otherwise resistant to certain interactions, at the carbons nearest the aldehyde moiety, resulting in a reduced tendency to discolor.

In short, the first aldehydic perfume raw materials according to the present disclosure do not include a divalent $—CH_2—CH_2—$ group immediately adjacent to the aldehyde moiety. Instead, the first aldehydic perfume raw materials may be characterized, for example, by branching, a double bond, and/or a ring structure within the first two carbon atoms adjacent to the aldehyde moiety. It is believed that these structures contribute to the PRMs' tendency to resist discoloration.

For example, the fragrance material may comprise first aldehydic perfume raw materials that are characterized by at least one of the following structures:

$$R^1—C(R^2)(R^3)—C(R^4)(R^5)—CHO, \quad a)$$

wherein $R^2$, $R^3$, $R^4$, and $R^5$ are independently selected from hydrogen or a hydrocarbon moiety, wherein the hydrocarbon moiety may be substituted or unsubstituted, with the proviso that at least one of $R^2$, $R^3$, $R^4$, or $R^5$ is a hydrocarbon moiety;

$$R^1—C(R^2)=C(R^4)—CHO, \quad b)$$

wherein $R^2$ and $R^4$ are independently selected from hydrogen or a hydrocarbon moiety, wherein the hydrocarbon moiety may be substituted or unsubstituted;

$$R^1—Ar—CHO, \quad c)$$

wherein Ar is a substituted or unsubstituted aryl ring;

wherein for each of the structures according to a), b), and c), each $R^1$ is independently selected from H, a substituted hydrocarbon moiety, or an unsubstituted hydrocarbon moiety.

The fragrance material may comprise first aldehydic perfume raw materials characterized by the structure of group a), $R^1—C(R^2)(R^3)—C(R^4)(R^5)—CHO$. The fragrance material may comprise first aldehydic perfume raw materials characterized by the structure of group b), $R^1—C(R^2)=C(R^4)—CHO$. The fragrance material may comprise first aldehydic perfume raw materials characterized by the structure of group c), $R^1—Ar—CHO$. The fragrance material may first aldehydic perfume raw materials characterized by the structures of at least two groups, preferably at least three groups, selected from groups a), b), and c).

The $R^1$ group may be any hydrocarbon moiety that is suitable to be part of a perfume raw material that is useful in the treatment composition according to the present disclosure. The $R^1$ group may be characterized by a molecular weight of from about 50 to about 500 Daltons, preferably from about 75 to about 400 Daltons, more preferably from about 100 to about 300 Daltons.

The $R^1$ group may be an unsubstituted hydrocarbon moiety. The $R^1$ group may be a substituted hydrocarbon moiety. The $R^1$ group may be a linear moiety. The $R^1$ group may be a non-linear or branched moiety. The $R^1$ group may be a saturated hydrocarbon moiety. The $R^1$ group may be an unsaturated hydrocarbon moiety. The $R^1$ group may comprise at least one double bond.

The first aldehydic perfume raw materials may have a structure according to Formula I:

$R^1$-L-CHO    Formula I wherein the L group is a divalent hydrocarbon moiety, wherein the divalent hydrocarbon moiety comprises from two carbons to twenty-five carbons, preferably from two to fifteen, more preferably from four to fifteen carbons, even more preferably from four to twelve, wherein the divalent hydrocarbon moiety is linear or branched, wherein the divalent hydrocarbon moiety is substituted or unsubstituted, and wherein the divalent hydrocarbon moiety does not comprise an unsubstituted ethylene ($—CH_2—CH_2—$) group joined to the —CHO (aldehyde) group, and wherein the $R^1$ group is a monovalent moiety selected from hydrogen or a monovalent hydrocarbon moiety, as described in more detail above.

The first aldehydic perfume raw materials may have a monovalent hydrocarbon moiety bonded to the aldehyde (—CHO) moiety, wherein the monovalent hydrocarbon moiety comprises at two carbon atoms in an alpha-beta position in relation to the aldehyde moiety, wherein the two carbon atoms at the alpha-beta position do not form a $—CH_2—CH_2—$ moiety (i.e., do not form a two-carbon non-substituted, non-branched alkane moiety).

Suitable first aldehydic perfume raw materials may include: PT Bucinal, hydroxycitronellal, citronellal, cymal, methyl nonyl acetaldehyde, melonal, helional, aldehyde mandrine, anisic aldehyde, heliotropin, vanillin, ethyl vanillin, lyral, triplal (i.e., ligustral), amyl cinnamic aldehyde, neo hivernal, nympheal, scentenal, or combinations thereof.

The fragrance material may comprise at least 1%, preferably from about 5% to about 40%, more preferably from about 5% to about 30%, by weight of the fragrance material, of the first aldehydic perfume raw materials. The fabric care composition may comprise from about 0.001% to about 1%, preferably from about 0.005% to about 0.5%, more preferably from about 0.01% to about 0.3%, by weight of the fabric care composition, of first aldehydic perfume raw materials.

The fragrance material may comprise other aldehydic perfume raw materials that are not hindered, sterically or otherwise, in the same way as the first aldehydic perfume raw materials. For example, the fragrance material may further comprise second aldehydic perfume raw materials, wherein the second aldehydic perfume raw materials are characterized by structures that are different from the first aldehydic perfume raw materials of groups a), b), and c). For example, the second aldehydic perfume raw materials may comprise linear aldehydes, such as octyl aldehyde, nonyl aldehyde, decyl aldehyde, or combinations thereof.

Because the second aldehydic perfume raw materials may be more likely to discolor than the first aldehydic perfume raw material, it may be preferred that the composition comprises relatively low amounts of the second aldehydic perfume raw materials. For example, the compositions of the present disclosure may comprise less than 25%, preferably less than 20%, more preferably less than 10%, even more preferably less than 5%, by weight of the fragrance material, of second aldehydic perfume moieties.

To minimize the risk of discoloration due to the presence of aldehydic perfume raw materials, the relative amount of first aldehydic perfume raw materials may be greater than the relative amount of second aldehydic perfume raw materials. For example, the weight ratio of first aldehydic perfume raw materials to second aldehydic perfume raw materials may be greater than 1:1, preferably at least 2:1, more preferably at least 5:1, even more preferably at least 10:1, even more preferably at least 20:1, or even more preferably at least 30:1. The weight ratio of first aldehydic perfume raw materials to second aldehydic perfume raw materials may be from greater than 1:1 to about 50:1, preferably from about 2:1 to about 30:1, more preferably from about 5:1 to about 30:1, even more preferably from about 10:1 to about 30:1.

To reduce the risk of discoloration, it may even be preferred to formulate a composition with first aldehydic perfume raw materials but not second aldehydic perfume raw materials; in such cases, the weight ratio (first:second) may be 100:0.

In total, the aldehydic perfume raw materials (e.g., first and second aldehydic PRMs) may be present at a level of from about 5% to about 75%, preferably from about 10% to about 50%, by weight of the fragrance material.

At least a portion of the fragrance materials of the present disclosure may be derived from naturally sourced materials. It is believed that such materials have a lesser environmental impact and/or are more environmentally sustainable compared to synthetically derived and/or geologically derived (such as petroleum-based) materials. At least about 50%, or at least about 60%, or at least about 70%, or at least about 80%, or at least about 90%, or at least about 95%, or about 100%, by weight of the fragrance materials, of the fragrance materials may be naturally derived fragrance materials.

For the fabric treatment compositions of the present disclosure, it is desirable for the fragrance materials to be relatively hydrophilic. Hydrophilic fragrance materials are more likely to adequately dissolve or disperse in the aqueous compositions of the present disclosure, leading to improved phase stability and/or product transparency.

Because the compositions of the present disclosure are typically characterized by a relatively low pH, the fragrance materials of the present disclosure are typically acid-stable, particularly at the pH of the composition. Acid stability may qualitatively be shown by the lack of phase separation, a lack of discoloration, and/or a lack of precipitate formation at an acidic pH upon storage, preferably at a pH of from about 2 to about 4.

To facilitate convenient incorporation of the fragrance material into the aqueous compositions of the present disclosure, the fragrance material may be mixed with a nonionic surfactant or other emulsifier prior to being mixed with the water and/or citric acid. Put another way, the composition may be made by a process in which the fragrance material is mixed with nonionic surfactant prior to being mixed with the citric acid.

The liquid fabric care compositions of the present disclosure are typically aqueous compositions. The liquid fabric care compositions typically comprise water. The compositions may comprise from about 30% to about 90%, by weight of the liquid fabric care composition, of water. The composition may comprise from about 50% to about 90% water, preferably from about 60% to about 85%, more preferably from about 70% to about 80%, by weight of the liquid fabric care composition.

Although the fabric treatment compositions of the present disclosure are aqueous, the compositions may further comprise organic solvent, which can improve composition stability, ingredient dissolution, and/or transparency of the composition. The fabric treatment compositions may include from about 0.1% to about 30%, or from about 1% to about 20%, by weight of the composition, of organic solvent. Suitable organic solvents may include ethanol, diethylene glycol (DEG), 2-methyl-1,3-propanediol (MPD), monopropylene glycol (MPG), dipropylene glycol (DPG), oligamines (e.g., diethylenetriamine (DETA), tetraethylenepentamine (TEPA)), glycerine, propoxylated glycerine, ethoxylated glycerine, ethanol, 1,2-propanediol (also referred to as propylene glycol), 1,3-propanediol, 2,3-butanediol, cellulosic ethanol, renewable propylene glycol, renewable monopropylene glycol, renewable dipropylene glycol, renewable 1,3-propanediol, and mixtures thereof. One or more of the organic solvents may be bio-based, meaning that they are derived from a natural/sustainable, non-geologically-derived (e.g., non-petroleum-based) source.

The liquid fabric care compositions of the present disclosure may comprise a hydrotrope, such as sodium cumene sulphonate (SCS), which may help with the stability of the composition.

The compositions of the present disclosure may comprise nonionic surfactant, which may help with product stability and/or incorporation of the fragrance materials. The composition may comprise from about 0.1 to about 8%, preferably from about 1% to about 5%, by weight of the liquid fabric care composition, of nonionic surfactant. The nonionic surfactant is preferably an ethoxylated fatty alcohol. The nonionic surfactant may be premixed with the fragrance materials.

In addition to the citric acid and/or salt thereof, the liquid fabric care composition may further comprise an additional organic acid. The additional organic acid may be selected from the group consisting of acetic acid, lactic acid, adipic acid, aspartic acid, carboxymethyloxymalonic acid, carboxymethyloxysuccinic acid, glutaric acid, hydroxyethyliminodiacetic acid, iminodiactic acid, maleic acid, malic acid, malonic acid, oxydiacetic acid, oxydisuccinic acid, succinic acid, sulfamic acid, tartaric acid, tartaric-discuccinic acid, tartaric-monosuccinic acid, or mixtures thereof, preferably acetic acid. It may be preferred that the composition is substantially free of an additional organic acid. It may be preferred that the composition is substantially free of acetic acid, which can add undesirable odors.

The liquid fabric care compositions of the present disclosure are acidic compositions. A low pH is believed to facilitate the benefits provided (e.g., limescale removal) by the present compositions. For example, the composition may be characterized by a neat pH of from about 2 to about 6, preferably from about 2 to about 5, preferably from about 2 to about 4, more preferably from about 2 to about 3. These ranges of pH are believed to facilitate the performance efficacy of the citric acid and/or salts thereof.

The compositions of the present disclosure may comprise a neutralizing agent, which can aid in achieving a desired pH. The neutralizing agent is preferably a caustic neutralizing agent, more preferably sodium hydroxide (NaOH). It is believed that strong bases, such as caustic neutralizing agents like NaOH, can provide physical stability benefits relative to weak bases, such as monoethanolamine (MEA).

The liquid fabric care compositions of the present disclosure may comprise a limited number of ingredients, for example, no more than ten, or no more than nine, or no more than eight, or no more than seven, or no more than six, or no more than five ingredients. Limiting the number of ingredients can result in lower storage and/or transportation costs of raw materials, and/or simplify the process of making the compositions. Consumers may also desire products having a limited number of ingredients, as they may be perceived as simpler, as having a smaller environmental footprint, and/or as providing an easier-to-understand ingredient list.

The liquid fabric care composition may comprise less than 10%, by weight of the liquid fabric care composition, of a material selected from the group consisting of detersive surfactant, bleaching systems, fabric softening materials, and mixtures thereof. The composition may comprise less than 8%, preferably less than 5%, preferably less than 4%, preferably less than 2.5%, preferably less than 1%, or even is substantially free of a material selected from the group consisting of detersive surfactant, bleaching systems, and/or fabric softening materials. Such materials may affect the aesthetics, physical stability, and/or chemical stability of the other ingredients in the present compositions. Additionally or alternatively, certain such materials may not be physically or chemically stable themselves in low-pH environment of the present compositions. Furthermore, consumers who use the present compositions may be hoping to remove materials from their treated fabrics, whereas at least some of the listed materials may instead deposit on fabric during a normal treatment cycle, building up undesirable residues.

The present compositions may be substantially free of detersive surfactants, including anionic, nonionic, amphoteric, and/or zwitterionic surfactants. Anionic surfactants may include: sulfated surfactants, such as alkyl sulfate or alkoxylated alkyl sulfate; sulfonated surfactants, such as (linear) alkyl benzene sulfonates; and/or carboxylated surfactants. Nonionic surfactants may include: alkoxylated fatty alcohols; alkoxylated alkyl phenols; and/or alkyl polyglucosides. Zwitterionic surfactants may include amine oxide and/or betaines.

The liquid fabric care composition may comprise less than 5%, preferably less than 3%, more preferably less than 1%, even more preferably less than 0.1%, by weight of the composition, of anionic surfactant.

As mentioned above, the liquid fabric care composition may comprise nonionic surfactant. When the composition comprises a nonionic surfactant, the composition may be substantially free of other (non-nonionic) surfactants.

The present compositions may be substantially free of bleaching systems. Bleaching systems may include peroxide bleaches, such as hydrogen peroxide and/or sources of peroxide. Bleaching systems may include hypohalite bleaches, such as hypochlorite bleaches, or sources of such hypohalites. Bleaching systems may also include bleach activators, such as NOBS or TAED, or bleach catalysts.

The present compositions may be substantially free of fabric softening materials. Such materials may deposit on fabric, which may be less preferred for certain consumers, applications, or fabrics. Additionally or alternatively, such materials may require emulsification or other processing to make them compatible with the present aqueous compositions. Fabric softening materials may be cationically charged and/or capable of becoming cationically charged in typical wash conditions. Fabric softening materials may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof. As used herein, the terms "fabric softening materials" is not intended to include any of the materials listed as organic acids above, including citric acid or acetic acid (e.g., vinegar).

The liquid fabric care compositions of the present disclosure may be relatively transparent. For example, the composition may be characterized by a percent transmittance (% T) of at least about 60% of light using a one-centimeter cuvette, at a wavelength of about 410-800 nanometers when the composition is substantially free of dyes.

As described above, the present compositions may be relatively transparent. Therefore, the present composition may be substantially free of particles, such as encapsulated benefit agents, silicone droplets, pearlescent agents, and/or opacifiers, which may reduce the relative transparency of the composition. The present compositions may be substantially free of optical brighteners. The present compositions may be substantially free of dyes. As used herein the term "dye" includes aesthetic dyes that modify the aesthetics of the cleaning composition as well as dyes and/or pigments that can deposit onto a fabric and alter the tint of the fabric. Dyes are intended to include colorants, pigments, and hueing agents. Depending on the desired application or aesthetics, the composition may comprise dye, preferably an aesthetic dye.

The liquid fabric care compositions of the present disclosure may be characterized by a relatively low viscosity. Such viscosities may be desirable for convenient pouring and/or little hang-up in a machine's dispenser drawer. The composition may be characterized by a viscosity of from about from about 0 to about 200 cps, preferably from about 0 to about 100 cps, more preferably from about 0 to about 60 cps, as determined by rotational viscometry using a Brookfield viscometer and ASTM D 2196-99 at 60 RPM and 22° C.

In an effort to keep viscosity low, the compositions of the present disclosure may be substantially free of thickeners or other rheology enhancers, such as structurants. The compositions may be substantially free of salts, such as inorganic salts like sodium chloride, magnesium chloride, and/or calcium chloride, that can provide rheology modification such as thickening. As used herein, such salts are not intended to include the neutralization products of the organic acids described herein.

The liquid fabric care compositions described herein can be packaged in any suitable container, including those constructed from paper, cardboard, plastic materials, and any suitable laminates. The container may contain renewable and/or recyclable materials.

The compositions may be packaged in a transparent or translucent container. It may be preferred to package a transparent fabric care composition in a transparent or translucent container, such as a transparent or translucent bottle. The container may have a transmittance of more than about 25%, or more than about 30%, or more than about 40%, or more than about 50% in the visible part of the spectrum (approx. 410-800 nm). Alternatively, absorbency of the bottle may be measured as less than about 0.6 or by having transmittance greater than about 25%, where % transmittance equals:

$$\frac{1}{10^{absorbency}} \times 100\%$$

For purposes of this disclosure, as long as one wavelength in the visible light range has greater than about 25% transmittance, it is considered to be transparent/translucent.

Clear bottle materials that may be used include, but are not limited to: polypropylene (PP), polyethylene (PE), polycarbonate (PC), polyamides (PA) and/or polyethylene terephthalate (PETE), polyvinylchloride (PVC); and polystyrene (PS). Recyclable materials may be preferred for environmental reasons.

The container or bottle may be of any form or size suitable for storing and packaging liquids for household use. For example, the container may have any size but usually the container will have a maximal capacity of about 0.05 to about 15 L, or about 0.1 to about 5 L, or from about 0.2 to about 2.5 L. The container may be suitable for easy handling. For example, the container may have handle or a part with such dimensions to allow easy lifting or carrying the container with one hand. The container may have a means suitable for pouring a liquid detergent composition and means for reclosing the container. The pouring means may be of any size or form. The closing means may be of any form or size (e.g., to be screwed or clicked on the container to close the container). The closing means may be cap, which can be detached from the container. Alternatively, the cap may be attached to the container, whether the container is open or closed. The closing means may also be incorporated in the container.

Method of Treatment

The present disclosure relates to a method of treating a fabric. The method includes the step of contacting the fabric with a liquid fabric care composition according to the present disclosure.

The contacting step may occur in the presence of water. The contacting step preferably occurs during a rinse cycle of an automatic washing machine.

The composition may be dispersed or dissolved in water, forming a treatment liquor. The pH of the treatment liquor may be greater (e.g., closer to seven) than the pH of the liquid fabric care composition. The treatment liquor may be characterized by a pH of from about 2, or from about 3, or from about 4 to about 7, or to about 6, or to about 5. The organic acid system (e.g., the citric acid and optional additional organic acids) of the fabric care composition may be selected so as to substantially buffer the treatment liquor to a desired pH. Additionally or alternatively, the fabric care composition may include other buffers or pH-balancing agents to deliver a desired pH in the treatment liquor.

The compositions are typically employed at concentrations of from about 500 ppm to about 15,000 ppm in solution (i.e., the treatment liquor).

The water temperature may range from about 5° C. to about 90° C. The weight ratio of the treatment liquor to fabric may be from about 1:1 to about 30:1.

The process may be a manual process, such as in a wash basin, or it may be an automatic process, occurring the drum of an automatic laundry machine. The machine may be a top-loading machine or a front-loading machine. The compositions of the present disclosure may be manually provided to the drum of an automatic washing machine, or they may be automatically provided, for example via a dispenser drawer or other vessel.

Typical treatment processes include at least one wash cycle and at least one subsequent rinse cycle. Fabrics may be treated with surfactant, such as anionic surfactant, during the wash cycle. The composition may be preferably provided to the drum, and/or the fabrics may be contacted with the composition, during a rinse cycle.

Method of Making

The present disclosure relates to a method of making a liquid fabric care composition as described herein. The method may include the step of combining water, citric acid and/or salts thereo, a fragrance material as described herein (including first aldehydic perfume raw materials), and water, for example amounts suitable for obtaining the wt %'s described herein. Preferably, the fragrance material is premixed with nonionic surfactant.

Any suitable processes known in the art may be used, for example batch processes, in-line mixing, and/or circulation-loop-based processes.

The method of making may include the steps of: providing an aqueous base, which may simply be water; adding citric acid, which may be part of an aqueous solution, such as a 50% citric acid solution; and adding fragrance material, which may be premixed with nonionic surfactant. Other optional materials, such as neutralizing agent, hydrotrope, additional surfactant and/or solvent, may be added as desired.

The aqueous base includes water. The aqueous base may include at least 50%, or at least 60%, or at least 70%, or at least 75%, or at least 80%, or at least 85%, or at least 90%, or at least 95%, by weight of the aqueous base, of water.

Combinations

Specifically contemplated combinations of the disclosure are herein described in the following lettered paragraphs. These combinations are intended to be illustrative in nature and are not intended to be limiting.

A. A liquid fabric care composition comprising: from about 10% to about 50%, by weight of the liquid fabric care composition, of citric acid and/or a salt thereof; from about 0.01% to about 20% of fragrance material, wherein the fragrance material comprises first aldehydic perfume raw materials, wherein the first aldehydic perfume raw materials are characterized by at least one of the following structures (a, b, or c):

- a) $R^1$—$C(R^2)(R^3)$—$C(R^4)(R^5)$—CHO, wherein $R^2$, $R^3$, $R^4$, and $R^5$ are independently selected from hydrogen or a hydrocarbon moiety, wherein the hydrocarbon moiety may be substituted or unsubstituted, with the proviso that at least one of $R^2$, $R^3$, $R^4$, or $R^5$ is a hydrocarbon moiety;
- b) $R^1$—$C(R^2)$═$C(R^4)$—CHO, wherein $R^2$ and $R^4$ are independently selected from hydrogen or a hydrocarbon moiety, wherein the hydrocarbon moiety may be substituted or unsubstituted;
- c) $R^1$—Ar—CHO, wherein Ar is a substituted or unsubstituted aryl ring;

wherein for each of the structures according to a), b), and c), each $R^1$ is independently selected from H, a substituted hydrocarbon moiety, or an unsubstituted hydrocarbon moiety; from about 30% to about 90%, by weight of the liquid fabric care composition, of water; wherein the composition comprises less than 5%, by weight of the liquid fabric care composition, of a material selected from the group consisting of detersive surfactant, bleaching systems, fabric softening materials, and mixtures thereof; wherein the liquid fabric care composition is characterized by a neat pH of from about 2 to about 6.

B. The liquid fabric care composition according to paragraph A, wherein the liquid fabric care composition comprises from about 15% to about 40%, preferably from about 20% to about 30%, by weight of the liquid fabric care composition, of the citric acid and/or the salt thereof.

C. The liquid fabric care composition according to any of paragraphs A or B, wherein the fragrance material comprises first aldehydic perfume raw materials characterized by the structure of group a).

D. The liquid fabric care composition according to any of paragraphs A-C, wherein the fragrance material comprises first aldehydic perfume raw materials characterized by the structure of group b).

E. The liquid fabric care composition according to any of paragraphs A-D, wherein the fragrance material comprises first aldehydic perfume raw materials characterized by the structure of group c).

F. The liquid fabric care composition according to any of paragraphs A-E, wherein the fragrance material comprises first aldehydic perfume raw materials characterized by the structures of at least two groups, preferably at least three groups, selected from groups a), b), and c).

G. The liquid fabric care composition according to any of paragraphs A-F, wherein the fragrance material comprises at least 1%, preferably from about 5% to about 40%, more preferably from about 5% to about 30%, by weight of the fragrance material, of the first aldehydic perfume raw materials.

H. The liquid fabric care composition according to any of paragraphs A-G, wherein the $R^1$ group is an unsubstituted hydrocarbon moiety.

I. The liquid fabric care composition according to any of paragraphs A-H, wherein the $R^1$ group is branched.

J. The liquid fabric care composition according to any of paragraphs A-I, wherein the $R^1$ group is characterized by a molecular weight of from about 50 to about 500 Daltons, preferably from about 75 to about 400 Daltons, more preferably from about 100 to about 300 Daltons.

K. The liquid fabric care composition according to any of paragraphs A-J, wherein the fragrance material comprises first aldehydic perfume raw materials selected from the group consisting of: PT Bucinal, hydroxycitronellal, citronellal, cymal, methyl nonyl acetaldehyde, melonal, helional, aldehyde mandrine, anisic aldehyde, heliotropin, vanillin, ethyl vanillin, lyral, triplal, amyl cinnamic aldehyde, neo hivernal, nympheal, scentenal, and combinations thereof.

L. The liquid fabric care composition according to any of paragraphs A-K, wherein the fragrance material further comprises second aldehydic perfume raw materials, wherein the second aldehydic perfume raw materials are characterized by structures that are different from the first aldehydic perfume raw materials of groups a), b), and c), preferably wherein a weight ratio of the first aldehydic perfume raw materials to the second aldehydic perfume raw materials is greater than 1:1, preferably is at least 2:1, more preferably is at least 5:1, even more preferably is at least 10:1, even more preferably is at least 20:1, or even more preferably is at least 30:1.

M. The liquid fabric care composition according to any of paragraphs A-L, wherein composition comprises from about 0.1% to about 10%, preferably from about 0.2% to about 5%, by weight of the composition, of the fragrance material.

N. The liquid fabric care composition according to any of paragraphs A-M, wherein the composition is made by a process in which the fragrance material is mixed with nonionic surfactant prior to being mixed with the citric acid.

O. The liquid fabric care composition according to any of paragraphs A-N, wherein the liquid fabric care composition comprises from about 50% to about 90% water, preferably from about 60% to about 85%, more preferably from about 70% to about 80%, by weight of the liquid fabric care composition.

P. The liquid fabric care composition according to any of paragraphs A-O, wherein the composition comprises less than 8%, preferably less than 5%, preferably less than 4%, preferably less than 2.5%, preferably less than 1%, or even is substantially free of a material selected from the group consisting of detersive surfactant, bleaching systems, and/or fabric softening materials.

Q. The liquid fabric care composition according to any of paragraphs A-P, wherein the composition comprises less than 5%, preferably less than 3%, more preferably less than 1%, even more preferably less than 0.1%, by weight of the composition, of anionic surfactant.

R. The liquid fabric care composition according to any of paragraphs A-Q, wherein the composition comprises from about 0.1% to about 8%, preferably from about 1% to about 5%, by weight of the liquid fabric care composition, of nonionic surfactant.

S. The liquid fabric care composition according to any of paragraphs A-R, wherein the composition further comprises an additional organic acid is selected from acetic acid, lactic acid, adipic acid, aspartic acid, carboxymethyloxymalonic acid, carboxymethyloxysuccinic acid, glutaric acid, hydroxyethlyliminodiacetic acid, iminodiactic acid, maleic acid, malic acid, malonic acid, oxydiacetic acid, oxydisuccinic acid, succinic acid, sulfamic acid, tartaric acid, tartaric-discuccinic acid, tartaric-monosuccinic acid, or mixtures thereof, preferably acetic acid.

T. The liquid fabric care composition according to any of paragraphs A-S, wherein the composition further comprises a neutralizing agent, preferably a caustic neutralizing agent, more preferably sodium hydroxide (NaOH).

U. The liquid fabric care composition according to any of paragraphs A-T, wherein the composition is characterized by a pH of from about 2 to about 5, preferably from about 2 to about 4, more preferably from about 2 to about 3.

V. The liquid fabric care composition according to any of paragraphs A-U, wherein the composition is characterized by a percent transmittance (% T) of at least about 60% of light using a 1 centimeter cuvette, at a wavelength of about 410-800 nanometers when the composition is substantially free of dyes.

W. The liquid fabric care composition according to any of paragraphs A-V, wherein the composition is characterized by a viscosity of from about from about 0 to about 200 cps, preferably from about 0 to about 100 cps, more preferably from about 0 to about 60 cps, as determined by rotational viscometry using a Brookfield viscometer and ASTM D 2196-99 at 60 RPM and 22° C.

X. The liquid fabric care composition according to any of paragraphs A-W, wherein the composition is packaged in a transparent or translucent container.

Y. A method of treating a fabric, the method comprising the steps of: contacting the fabric with a composition according to any of paragraphs A-X.

Z. A method of making the liquid fabric care composition according to any of paragraphs A-X, the method comprising the steps of: combining water, citric acid, and a fragrance material, preferably wherein the fragrance material is premixed with nonionic surfactant.

Test Methods

Method for Measuring Color of Samples

Samples are placed in square glass vials available from VWR, Randor, Pennsylvania, item number 10862-182. All reflectance spectra and color measurements, including L*, a*, and b* values of samples are made using Lab Scan Ultrascan VIS reflectance spectrophotometer (HunterLabs, Reston, VA; D65 illumination, UV light excluded). The instrument is calibrated following the calibration instructions for reflectance spectra. Color samples are then measured using the reflectance test method of the instrument by placing the sample flush with the port hole of the instrument and arranging the white backing tile such that it holds the sample flat against the port hole while the measurement is taken.

Method of Aging Samples

After initial color readings are made, the square glass vials containing the product samples are placed in temperature-controlled rooms at 50 C (+/−2 C) and 25 C (+/−2 C). Samples are removed from the temperature-controlled rooms on a weekly basis and allowed to equilibrate to room temperature. After the samples have equilibrated to room temperature, they are measured via the color method described above. The samples are then replaced back at their respective temperature-controlled room after each aged color measurement is complete.

Method for Measuring pH

The pH of the liquid fabric care product is measured using a Extech Instrument Model pH300 pH probe, available from W. W. Grainger, Inc. Lake Forrest Illinois. The pH probe is first properly calibrated using pH buffer solutions of pH 1.68, pH 4.00, and pH 7.00. The probe is then used to measure the neat liquid acid rinse product with no product dilution. The sample is measured at a temperature between 20 C-25 C. The probe is rinsed with deionized water and carefully wiped clean and dried in between reading the pH of different samples.

EXAMPLES

The examples provided below are intended to be illustrative in nature and are not intended to be limiting.

Example 1. PRM Selection and Color Stability

To test the influence of perfume raw material (PRM) selection on color stability in liquid acidic fabric care compositions, various products are made with different PRMs. More specifically, the products are made with a range of aldehydic PRMs in combination with a non-aldehydic PRM (methyl anthranilate), stored at 50° C., and tested for color stability.

Separate perfume premixes are made using the following aldehydic PRMs, which are structurally described in more detail below: undecylenic aldehyde, decyl aldehyde, lauric aldehyde, intreleven aldehyde, PT Bucinal, hydroxycitronellal, citronellal, cymal, methyl nonyl acetaldehyde, melonal, helional, aldehyde mandarine, hexyl cinnamic aldehyde, anisic aldehyde, heliotropin, and vanillin. A perfume premix is also made with only methyl anthranilate.

The structures of the tested PRMs are provided in Table 1 below, along with a short structural description with regard to the moiety adjacent to the aldehyde moiety; in some cases, only a representative isomer is shown, although it is recognized that other isomers may be present in a given sample of the PRM. The PRMs are sorted into five groups (A-E), generally by structure. The PRMs of groups B, C, and D are generally considered to be first aldehydic perfume raw materials according to the present disclosure, whereas the PRMs of groups A and E are comparative materials (marked with an asterisk, "*").

TABLE 1

| Group | Leg | Tested PRM | Structural description of moiety next to aldehyde | Structure |
|---|---|---|---|---|
| A | 1* | Undecylenic Aldehyde | Linear alkane | 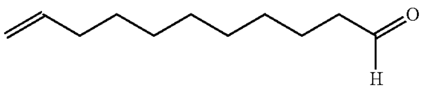 |
| | 2* | Decyl Aldehyde | Linear alkane | 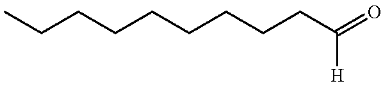 |
| | 3* | Lauric Aldehyde | Linear alkane | 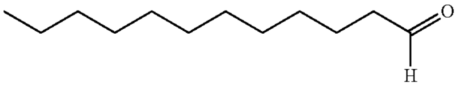 |
| | 4* | Intreleven Aldehyde | Linear alkane | 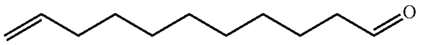 |
| B | 5 | PT Bucinal | Methyl branched on beta carbon | 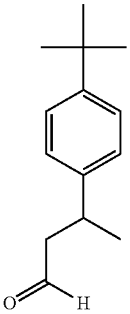 |
| | 6 | Hydroxycitronellal | Methyl branched on beta carbon | 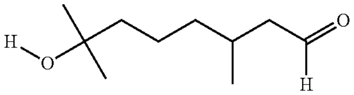 |
| | 7 | Citronellal | Methyl branched on beta carbon | 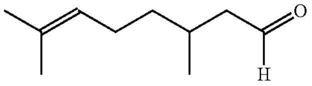 |
| C | 8 | Cymal | Methyl branched on alpha carbon | 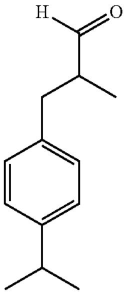 |
| | 9 | Methyl Nonyl Acetaldehyde | Methyl branched on alpha carbon | 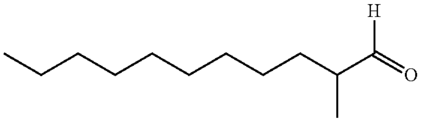 |
| | 10 | Melonal | Methyl branched on alpha carbon | 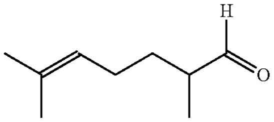 |

TABLE 1-continued

| Group | Leg | Tested PRM | Structural description of moiety next to aldehyde | Structure |
|---|---|---|---|---|
| | 11 | Helional | Methyl branched on alpha carbon | 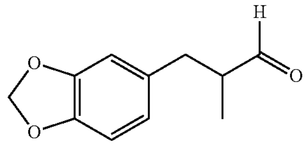 |
| D | 12 | Aldehyde Mandarine | Double bond on alpha carbon | 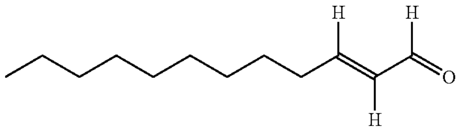 |
| | 13 | Hexyl Cinnamic Aldehyde | Branched & double bond on alpha carbon | 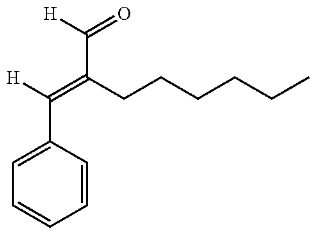 [SMILES: CCCCCC/C(C=O)=C\c1ccccc1] |
| | 14 | Anisic Aldehyde | Aromatic ring | 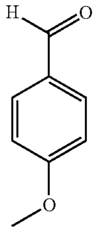 |
| | 15 | Heliotropin | Aromatic ring | 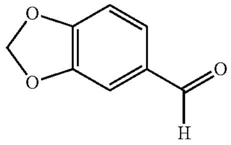 [SMILES: O=Cc1ccc2c(c1)OCO2] |
| | 16 | Vanillin | Aromatic ring | 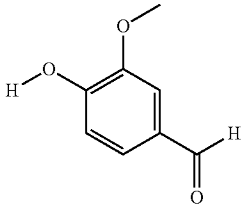 |
| E | 17* | Methyl Anthranilate | N/A [non-aldehydic PRM] | 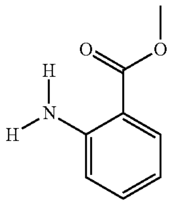 |

The perfume premixes are formed by mixing 72.7 parts by weight of nonionic surfactant (C24-9, ex Huntsman Corp, Port Neches, Texas), 13.7 parts of the tested perfume raw material (see below; ex Vigon International Inc, East Stroudsburg, Pennsylvania, USA), and 13.7 parts methyl anthranilate (ex Vigon International Inc.) using an appropriately sized container used to contain the mixture. Mixing is performed using an IKA RW 20D 51 overhead mixer, model RW20D-S1 and R 1325 four-bladed propeller stirrer (ex VWR Randor Pennsylvania). The premix is made no more than 2 hrs prior to use in completing the liquid acidic fabric care composition.

Liquid acidic fabric care products are made by mixing the ingredients listed in Table 2 in the following proportions.

TABLE 2

| Ingredients[1] | Wt % |
|---|---|
| Citric Acid Solution[2] | 46.85% |
| Sodium Formate Solution[3] | 0.50% |
| Sodium Hydroxide Solution[4] | 4.10% |
| Propylene Glycol[5] | 5.29% |
| Sodium Cumenesulfonate Solution[6] | 2.35% |
| NI C24-9[7] | 0.11% |
| Perfume premix[8] | 0.74% |
| Water | To 100% |
| Product pH | 2.3-2.9 |

[1]An appropriately sized container is used to contain the mixture. Mixing is done using an IKA RW 20D S1 overhead mixer, model RW20D-S1 and R 1345 four-bladed propeller stirrer, from VWR Randor, Pennsylvania.
[2]50.5% active citric acid solution of food grade quality available from Tate and Lyle PLC, Dayton, Ohio
[3]30% active sodium formate solution created by mixing 30% by weight sodium formate powder, available from Perstorm Polyols Inc, Toledo, Kansas, with 70% by weight deionized water in an appropriately sized container used to contain the mixture.
[4]50% active sodium hydroxide solution membrane grade available from Formosa Plastics Corp, Baton Rouge, Louisiana
[5]Bio-sourced grade available from Archer Daniels Midland, Decatur, Illinois
[6]45% active sodium cumenesulfonate solution available from Nease Corp, Harrison, Ohio
[7]This is a NI C24-9 addition to the product that is separate from the NI C24-9 added in the perfume premix composition described above. Available from Huntsman Corp, Port Neches, Texas
[8]Weight % given is in terms of the total amount of premix composition added, where the premix is prepared according to the previous paragraph After the products are made, they are stored for one week at 50° C. After the storage period, they are assessed for color stability, namely by measuring the change in b-value according to the methods provided herein. The results for each leg are provided in Table 3 below. The PRMs are sorted by structural groups next to the aldehyde moiety, and an average is provided for the change in b-value for each group.

TABLE 3

| Group | Leg | Tested PRM | Structural description of moiety next to aldehyde | Change in b-value after 1 week, 50° C. | AVG. |
|---|---|---|---|---|---|
| A | 1* | Undecylenic Aldehyde | Linear alkane | 19.09 | 17.67 |
| | 2* | Decyl Aldehyde | Linear alkane | 15.96 | |
| | 3* | Laurie Aldehyde | Linear alkane | 18.47 | |
| | 4* | Intreleven Aldehyde | Linear alkane | 17.14 | |
| B | 5 | PT Bucinal | Methyl branched on beta carbon | 13.83 | 14.55 |
| | 6 | Hydroxycitronellal | Methyl branched on beta carbon | 17.92 | |
| | 7 | Citronellal | Methyl branched on beta carbon | 11.90 | |
| C | 8 | Cymal | Methyl branched on alpha carbon | 13.65 | 10.21 |
| | 9 | Methyl Nonyl Acetaldehyde | Methyl branched on alpha carbon | 10.93 | |
| | 10 | Melonal | Methyl branched on alpha carbon | 8.86 | |
| | 11 | Helional | Methyl branched on alpha carbon | 7.41 | |
| D | 12 | Aldehyde Mandarine | Double bond on alpha carbon | 8.36 | 8.94 |
| | 13 | Hexyl Cinnamic Aldehyde | Branched & double bond on alpha carbon | 8.81 | |
| | 14 | Anisic Aldehyde | Aromatic ring | 7.56 | |
| | 15 | Heliotropin | Aromatic ring | 9.74 | |
| | 16 | Vanillin | Aromatic ring | 9.52 | |
| E | 17* | Methyl Anthranilate | N/A [non-aldehydic PRM] | 6.47 | 6.47 |

*= comparative material

According to the results in Table 3, the comparative aldehydic perfume raw materials of Group A show, on average, the most color change (based on change in b-value after storage at one week at 50° C. In contrast, the PRMs of groups B, C, and D (e.g., first aldehydic perfume raw materials according to the present disclosure) show, on average, relatively less color change.

According to the results of Table, 3, the non-aldehydic PRM of Group E (methyl anthranilate, another comparative material) shows relatively little color change, indicating that the discoloration issue is particularly problematic with aldehydic PRMs, which shows that the formulator's careful selection of such PRMs as disclosed herein is beneficial to product color stability.

Example 2. Exemplary Method of Making a Composition

A composition according to the present disclosure may be made according to the following method. Mixing generally occurs throughout the process, and the mixture is cooled to manage the heat of neutralization.

Provide a target amount of water (67.7% active in final formulation) into an appropriate vessel. Separately, combine propanediol (5.3% active in final formulation) with a first portion of nonionic surfactant (C24-9; 0.1% active in formula) to create a premix. Add this premix to the water in the vessel. It is believed that this premix is useful as a processing aid, which may include minimizing surfactant gelling and/or accelerating solubilization.

To the mixture, add a target amount of citric acid solution (50.5% activity level) such that 23.7% active citric acid is present in the final formulation. (Citric acid may instead be added as a powder.) Add sodium formate solution (30% activity level) to provide 0.16% sodium formate in the final formulation. The sodium formate may be added after the citric acid, but preferably is added in parallel. Sodium bisulfate may optionally be added. Add sodium cumene sulfonate ("SCS"; 45% activity level) to provide 1.1% active SCS to the final formulation.

Add enough sodium hydroxide (NaOH) solution (50% activity level) to achieve a target pH range of 2.5 (approximately 1.3-3.0% active NaOH by weight of final formulation). The SCS and NaOH may preferably be added in parallel, but preferably via different input ports. This results in the base (unperfumed) formulation.

To add perfume, combine a second portion of the nonionic surfactant (in an amount sufficient to provide 4% in the final formulation) with the perfume (1.5% active in final formulation) to form a perfume premix. It is believed that the nonionic surfactant facilitates incorporation of the perfume into the (aqueous) base formulation and results in stability benefits in the final product formulation. After the base formulation has been cooled (e.g., to ambient temperature), add the perfume premix to the base formulation to complete the final product formulation.

Example 3. Exemplary Product Formulations

Exemplary product formulations for liquid fabric care compositions are provided below in Table 4. Amounts are given by weight percent.

TABLE 4

| Ingredients | 1 | 2 | 3 | 4 | 5 |
|---|---|---|---|---|---|
| Citric Acid Solution [2] | 46.85% | 42.16% | 23.42% | 58.57% | 46.85% |
| Acetic Acid Solution [8] | — | — | — | — | 1.09% |
| Sodium Formate Solution [3] | 0.50% | 0.50% | 0.50% | 0.50% | 0.50% |
| Sodium Hydroxide Solution [4] | 3.00% | 3.00% | 1.50% | 4.10% | 3.00% |
| Propylene Glycol [5] | 5.00% | 5.00% | 5.00% | 5.00% | 5.00% |
| Sodium Cumenesulfonate Solution [6] | 2.22% | 2.22% | 2.22% | 2.22% | 2.78% |
| NI C24-9 [7] | 0.10% | 0.10% | 0.10% | 0.10% | 0.10% |
| Perfume premix [9] | 5.50% | 5.50% | 5.00% | 5.50% | 6.50% |
| Water | To 100% | To 100% | To 100% | To 100% | To 100% |
| pH | pH 2.3-2.9 | pH 2.3-2.9 | pH 2.3-2.9 | pH 2.3-2.9 | pH 2.3-2.9 |

[2] 50.5% active citric acid solution of food grade quality available from Tate and Lyle PLC, Dayton, Ohio
[3] 30% active sodium formate solution created by mixing 30% by weight sodium formate powder, available from Perstorm Polyols Inc, Toledo, Kansas, with 70% by weight deionized water in an appropriately sized container used to contain the mixture.
[4] 50% active sodium hydroxide solution membrane grade available from Formosa Plastics Corp, Baton Rouge, Louisiana
[5] Bio-sourced grade available from Archer Daniels Midland, Decatur, Illinois
[6] 45% active sodium cumenesulfonate solution available from Nease Corp, Harrison, Ohio
[7] This is a NI C24-9 addition to the product that is separate from the NI C24-9 added in a perfume premix composition. Available from Huntsman Corp, Port Neches, Texas
[8] 14.70% active distilled white vinegar/acetic acid solution available from Fleischmann's Vinegar Company Inc, Baltimore, Maryland.
[9] Perfume premix is three parts perfume by weight, and eight parts of nonionic surfactant (NI C24-9). The perfume portion may be a mixture of perfume raw materials in the following proportions, as shown in Table 5. Those marked by "*" are hindered aldehydic PRMs (e.g., first aldehydic PRMs) and are present in a total amount of 26.7%, by weight of the perfume portion. Those marked by "**" are non-hindered aldehydic PRMs (e.g., second aldehydic PRMs) and are present in a total amount of 1.3%, by weight of the perfume portion. The weight ratio of first-to-second aldehydic PRMs is approximately 20.5:1.

TABLE 5

| CAS | PRM Name | wt % |
|---|---|---|
| 6790-58-5 | AMBRONAT | 0.250 |
| 3681-71-8 | CIS 3 HEXENYL ACETATE | 1.000 |
| 106-22-9 | CITRONELLOL | 2.000 |
| 18479-58-8 | DIHYDRO MYRCENOL | 8.000 |
| 5413-60-5 | FLOR ACETATE | 6.000 |
| 106-24-1 | GERANIOL | 1.000 |
| 34902-57-3 | HABANOLIDE 100 pct | 6.000 |
| 6259-76-3 | HEXYL SALICYLATE | 8.000 |
| 7388-22-9 | IONONE GAMMA METHYL | 7.000 |
| 68155-67-9 | ISO E SUPER OR WOOD | 8.000 |
| 78-70-6 | LINALOOL | 7.000 |
| 51685-40-6 | LINALYL ACETATE | 2.500 |
| 93-08-3 | METHYL BETA-NAPHTHYL KETONE | 2.000 |
| 56973-85-4 | NEOBUTENONE ALPHA | 0.250 |
| 5989-27-5 | ORANGE TERPENES | 3.000 |
| 102-20-5 | PHENYL ETHYL PHENYL ACETATE | 3.000 |
| 104-67-6 | UNDECALACTONE | 3.000 |
| 88-41-5 | VERDOX | 4.000 |
| 103-95-7 | CYMAL* | 2.000 |
| 121-32-4 | ETHYL VANILLIN* | 1.000 |

TABLE 5-continued

| CAS | PRM Name | wt % |
|---|---|---|
| 125109-85-5 | FLORHYDRAL* | 1.000 |
| 1205-17-0 | HELIONAL* | 1.500 |
| 120-57-0 | HELIOTROPIN* | 0.800 |
| 101-86-0 | HEXYL CINNAMIC ALDEHYDE* | 9.900 |
| 68039-49-6 | LIGUSTRAL (aka, TRIPLAL)* | 1.000 |
| 106-72-9 | MELONAL* | 0.500 |
| 80-54-6 | P.T. BUCINAL* | 9.000 |
| 112-31-2 | DECYL ALDEHYDE** | 0.700 |
| 112-54-9 | LAURIC ALDEHYDE** | 0.400 |
| 112-45-8 | UNDECYLENIC ALDEHYDE** | 0.200 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid fabric care composition comprising:

from about 10% to about 50%, by weight of the liquid fabric care composition, of citric acid and/or a salt thereof;

from about 0.01% to about 20% of fragrance material, wherein the liquid fabric care composition is free of vinegar and acetic acid;

wherein the fragrance material comprises first aldehydic perfume raw materials, wherein the first aldehydic perfume raw materials are characterized by at least one of the following structures:

$R^1$—C($R^2$)($R^3$)—C($R^4$)($R^5$)—CHO, a)

wherein $R^2$, $R^3$, $R^4$, and $R^5$ are independently selected from hydrogen or a hydrocarbon moiety, wherein the hydrocarbon moiety may be substituted or unsubstituted, with the proviso that at least one of $R^2$, $R^3$, $R^4$, or $R^5$ is a hydrocarbon moiety;

$R^1$—C($R^2$)=C($R^4$)—CHO, b)

wherein $R^2$ and $R^4$ are independently selected from hydrogen or a hydrocarbon moiety, wherein the hydrocarbon moiety may be substituted or unsubstituted;

$R^1$—Ar—CHO, c)

wherein Ar is a substituted or unsubstituted aryl ring;

wherein for each of the structures according to a), b), and c), each $R^1$ is independently selected from H, a substituted hydrocarbon moiety, or an unsubstituted hydrocarbon moiety;

from about 30% to about 90%, by weight of the liquid fabric care composition, of water;

wherein the composition comprises less than 5%, by weight of the liquid fabric care composition, of a material selected from the group consisting of detersive surfactant, bleaching systems, fabric softening materials, and mixtures thereof;

wherein the liquid fabric care composition is characterized by a neat pH of from about 2 to about 6.

2. The liquid fabric care composition according to claim 1, wherein the liquid fabric care composition comprises from about 15% to about 40%, by weight of the composition, of the citric acid and/or the salt thereof.

3. The liquid fabric care composition according to claim 1, wherein the fragrance material comprises first aldehydic perfume raw materials characterized by the structure of group a).

4. The liquid fabric care composition according to claim 1, wherein the fragrance material comprises first aldehydic perfume raw materials characterized by the structure of group b).

5. The liquid fabric care composition according to claim 1, wherein the fragrance material comprises first aldehydic perfume raw materials characterized by the structure of group c).

6. The liquid fabric care composition according to claim 1, wherein the fragrance material comprises first aldehydic perfume raw materials characterized by the structures of at least two groups selected from groups a), b), and c).

7. The liquid fabric care composition according to claim 1, wherein the fragrance material comprises at least 1%, by weight of the fragrance material, of the first aldehydic perfume raw materials.

8. The liquid fabric care composition according to claim 1, wherein the $R^1$ group is an unsubstituted hydrocarbon moiety.

9. The liquid fabric care composition according to claim 1, wherein the $R^1$ group is branched.

10. The liquid fabric care composition according to claim 1, wherein the $R^1$ group is characterized by a molecular weight of from about 50 to about 500 Daltons.

11. The liquid fabric care composition according to claim 1, wherein the fragrance material comprises first aldehydic perfume raw materials selected from the group consisting of: PT Bucinal, hydroxycitronellal, citronellal, cymal, methyl nonyl acetaldehyde, melonal, helional, aldehyde mandrine, anisic aldehyde, heliotropin, vanillin, ethyl vanillin, lyral, triplal, amyl cinnamic aldehyde, neo hivernal, nympheal, scentenal, and combinations thereof.

12. The liquid fabric care composition according to claim 1, wherein the fragrance material further comprises second aldehydic perfume raw materials, wherein the second aldehydic perfume raw materials are characterized by structures that are different from the first aldehydic perfume raw materials of groups a), b), and c).

13. The liquid fabric care composition according to claim 1, wherein the liquid fabric care composition comprises from about 50% to about 90% water, by weight of the liquid fabric care composition.

14. The liquid fabric care composition according to claim 1, wherein the composition comprises from about 0.1% to about 8%, by weight of the liquid fabric care composition, of nonionic surfactant.

15. The liquid fabric care composition according to claim 1, wherein the composition is characterized by a pH of from about 2 to about 5.

16. The liquid fabric care composition according to claim 1, wherein the composition is characterized by a percent transmittance (% T) of at least about 60% of light using a 1 centimeter cuvette, at a wavelength of about 410-800 nanometers when the composition is substantially free of dyes, and wherein the composition is packaged in a transparent or translucent container.

17. The liquid fabric care composition according to claim 1, wherein the composition is characterized by a viscosity of 0 to about 200 cps, as determined by rotational viscometry using a Brookfield viscometer and ASTM D 2196-99 at 60 RPM and 22° C.

18. A method of treating a fabric, the method comprising the steps of:

contacting the fabric with a composition according to claim 1.

19. A method of making the liquid fabric care composition according to claim 1, the method comprising the steps of:

combine water, citric acid, and a fragrance material, optionally wherein the fragrance material is premixed with nonionic surfactant.

* * * * *